(12) United States Patent
Suzuki et al.

(10) Patent No.: US 7,450,347 B2
(45) Date of Patent: Nov. 11, 2008

(54) HEAD SUSPENSION WITH BRIDGE PORTION SEPARATING APERTURES NEAR LIFT TAB

(75) Inventors: Kohichi Suzuki, Kanagawa (JP); Shingo Tsuda, Kanagawa (JP); Mutsuro Ohta, Kanagawa (JP); Hiroyasu Tsuchida, Kanagawa (JP); Akihiro Aoyagi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 239 days.

(21) Appl. No.: 11/097,817

(22) Filed: Mar. 31, 2005

(65) Prior Publication Data

US 2005/0219757 A1 Oct. 6, 2005

(30) Foreign Application Priority Data

Mar. 31, 2004 (JP) .......................... 2004-103832

(51) Int. Cl.
  *G11B 21/22* (2006.01)
  *G11B 21/16* (2006.01)
  *G11B 5/54* (2006.01)
  *G11B 5/48* (2006.01)
(52) U.S. Cl. ..................................... 360/255; 360/245
(58) Field of Classification Search ............. 360/254.6, 360/255, 255.5, 255.9, 244, 244.2, 245
  See application file for complete search history.

(56) References Cited

U.S. PATENT DOCUMENTS 5,027,241 A * 6/1991 Hatch et al. ................. 360/255
6,067,209 A * 5/2000 Aoyagi et al. ............... 360/255
6,151,197 A * 11/2000 Larson et al. ................ 360/255
2003/0039074 A1 * 2/2003 Erpelding ................. 360/244.2
2005/0180052 A1 * 8/2005 Suzuki et al. ............. 360/245.7
2005/0237670 A1 * 10/2005 Fujimoto et al. ......... 360/244.2

FOREIGN PATENT DOCUMENTS

| JP | 11-345474 | 12/1999 |
|---|---|---|
| JP | 2000-076811 | 3/2000 |
| JP | 2001-137966 A | 5/2000 |
| JP | 2000-298966 | 10/2000 |
| JP | 2001-014783 A | 1/2001 |
| JP | 2001-283545 A | 10/2001 |
| JP | 2004-039164 A | 2/2004 |

* cited by examiner

*Primary Examiner*—Craig A Renner
(74) *Attorney, Agent, or Firm*—Townsend and Townsend and Crew LLP; Darren Gold (57) ABSTRACT

A magnetic disk drive is to be provided wherein a ramp and a magnetic disk do not overlap each other and both rigidity and dynamic characteristics of a suspension are maintained. In one embodiment, a ramp and an actuator lying at a retractive position are spaced away from and do not overlap an outer peripheral end of a magnetic disk. A tab is formed centrally of a front end of a load beam and is bent in U shape. Flanges are formed along both longitudinal edges of the load beam. An aperture is formed in a front portion of the load beam. The aperture permits the tab to be machined in a desired shape. An aperture is formed behind the aperture. The apertures are not formed in an integrally contiguous manner but are separated from each other by a bridge portion.

17 Claims, 9 Drawing Sheets

HEAD SUSPENSION WITH BRIDGE PORTION SEPARATING APERTURES NEAR LIFT TAB

CROSS-REFERENCES TO RELATED APPLICATIONS

This application claims priority from Japanese patent application No. JP 2004-103832, filed Mar. 31, 2004, the entire disclosure of which is incorporated herein by reference.

BACKGROUND OF THE INVENTION

The present invention relates to a suspension and a data storage device using the suspension. Particularly, the present invention is concerned with a suspension and a data storage device suitable for a hard disk drive of a load/unload type.

Devices using various types of media such as optical disks and magnetic tapes are known as data storage devices. Among them, hard disk drives (HDD) have become popular as storage devices for computers to such an extent that they are one of the storage devices indispensable for today's computer systems. Further, not limited to computer systems, the application of the HDDs is widening more and more due to the superior characteristics with the advent of moving picture recording/reproducing devices, car navigation systems, removable memories for digital cameras and so on.

The HDD includes a magnetic disk for recording data and a head which writes and reads data to and from the magnetic disk. The head includes a head element as a thin film element and a slider with the head element disposed on a surface thereof. The head element comprises a storage element which converts an electric signal into a magnetic field in accordance with data to be recorded to the magnetic disk and a reproducing element which converts a magnetic field from the magnetic disk into an electric signal. Typically, the storage element and the reproducing element are integrally formed in one thin film element.

The HDD further includes an actuator for moving the head to a desired position above the magnetic disk. The actuator is moved pivotally about a pivot shaft by means of a voice coil motor (VCM), thereby causing the head to move radially above the magnetic disk which is rotating. As a result, the head (head element) accesses a desired track formed on the magnetic disk and can read or write data.

The HDD of a load/unload type further includes a ramp for retraction of the head from above the magnetic disk surface. The ramp is positioned in proximity to an outer peripheral end of the magnetic disk. When the rotation of the magnetic disk stops, the head is attracted to the magnetic disk surface. Therefore, when the rotation of the magnetic disk stops, the actuator causes the head to retract from the recording surface of the magnetic disk to the ramp. Typically, the ramp and the actuator are each disposed at a position where the ramp and the magnetic disk overlap each other or a position where the actuator lying in a retractive position and the magnetic disk overlap each other. Consequently, the overlapping of the magnetic disk and the ramp or the magnetic disk and the actuator causes a windage loss, which leads to an increase of power consumption.

Figure 10:
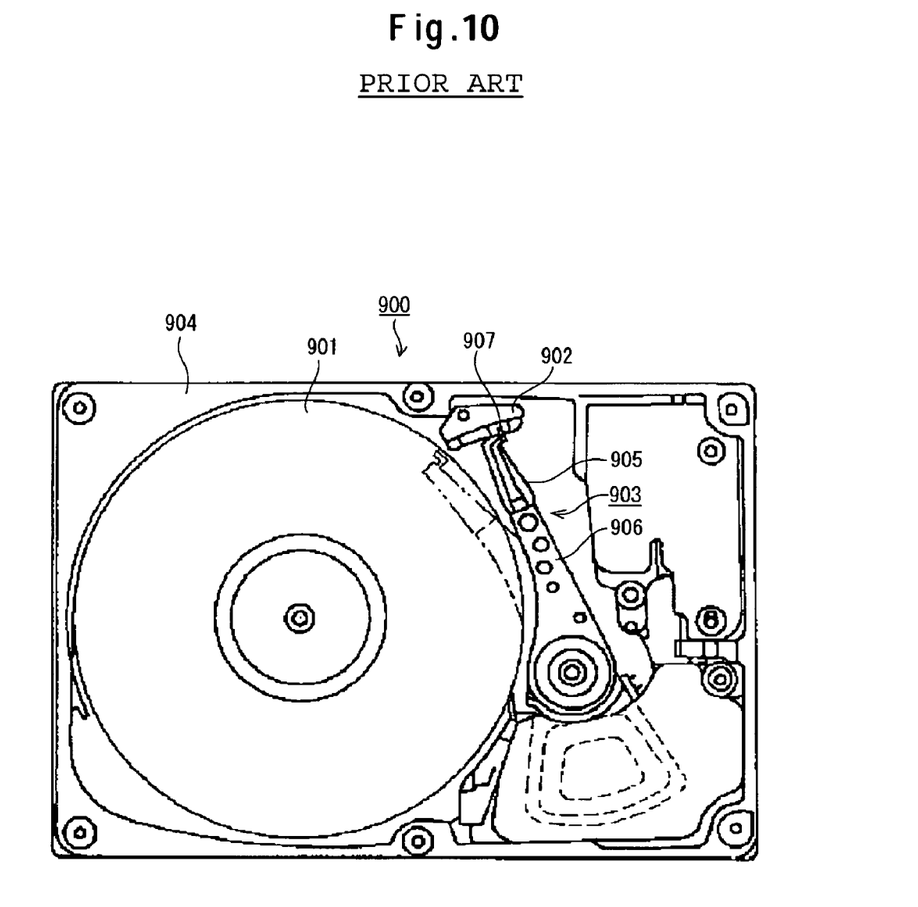
FIG. 10 illustrates a schematic construction of a conventional hard disk drive.

FIG. 10 is a plan view showing the construction of HDD 900 of a load/unload type disclosed in Japanese Patent Laid-Open No. 2000-076811. In the HDD shown in FIG. 10, a magnetic disk 901, a ramp 902 and an actuator 903 are disposed within a case 904 without overlap of the magnetic disk 901 and the ramp 902 and overlap of the magnetic disk 901 and the actuator 903 lying in a retractive position. The actuator 903 includes a suspension 905 and an arm 906. The suspension 905 includes a tab 907 extending from a front end of the suspension and engageable with the ramp 902. The tab 907 is offset from a central axis of the suspension 905 and is positioned on an outer periphery side of the magnetic disk 901. When the actuator 903 retracts to the ramp 902, the tab 907 slides on the surface of the ramp 902 and stops at a stop position on the ramp 902.

BRIEF SUMMARY OF THE INVENTION

As described above, from the standpoint of decreasing the power consumption, it is preferable to avoid overlapping of the magnetic disk and the ramp or overlapping of the magnetic disk and the actuator lying in the retractive position. This is preferred also from the standpoint of a manufacturing process. In the case where the magnetic disk and the ramp overlap each other or the magnetic disk and the actuator lying in the retractive position overlap each other, it is necessary to assemble the ramp or the actuator after assembly of the magnetic disk. This is because dust produced at the time of assembling the ramp or the actuator is apt to be deposited on the magnetic disk and causes deterioration in reliability of the HDD. This problem can be solved by the foregoing construction of HDD 900 wherein the ramp 902 and the actuator 903 are spaced away from the magnetic disk 901.

However, in the HDD 900 disclosed in the above patent reference, the tab 907 is offset from the central part of the front end of the suspension 905 and is positioned on the outer periphery side of the magnetic disk 901. In such a construction, dynamic characteristics of the suspension 905 (or the actuator 903) deteriorate markedly. The suspension 905 oscillates in seek motion (pivotal motion). The oscillation mainly includes a sway component as oscillation in the pivoting direction of the actuator and a torsion component as oscillation (rolling) in a torsional direction of the suspension. Particularly, in the case where the tab is formed in an offset position from the central part at the front end of the suspension 905 as in the HDD 900, the oscillation of the torsion component becomes large. With the recent increase of the recording density, the track pitch is becoming more and more narrow and therefore a large torsional oscillation component obstructs an accurate track following operation.

On the other hand, as pointed out in the above patent reference, there is known a construction wherein the tab is disposed on a torsion center line of the suspension to suppress oscillation of the torsion component and thereby prevent the occurrence of moment which causes rolling of the suspension. The above patent reference further points out that this construction is not preferable. As the reason therefor, the same literature states that, to dispose the ramp outside the magnetic disk, it is necessary to form the tab long enough to project from the outer periphery of the magnetic disk, and that the long tab causes deterioration of impact resistance when the device is subjected to a shock.

As noted above, to suppress oscillation of the suspension, it is preferable to form the tab centrally of the front end of the suspension. On the other hand, in the case where the tab is formed long for unloading to the ramp located at a position not overlapping the magnetic disk, it is necessary to suppress deterioration in dynamic characteristics and rigidity of the suspension. That is, it is necessary to provide a construction having rigidity high enough to suppress deterioration of lift-up rigidity in loading and unloading or suppress deterioration of impact resistance. At the same time, it is necessary to suppress the occurrence of an oscillation peak during seek or in a target track following operation. Thus, it is necessary to enhance the rigidity. However, to suppress the deterioration of dynamic characteristics, an increase in weight of the suspension must be avoided.

The present invention has been accomplished with the above circumstances as background and it is a feature of the invention to provide a suspension structure permitting an assembling process which enhances the reliability of a data storage device and capable of suppressing the deterioration of rigidity and dynamic characteristics.

A data storage device in accordance with a first aspect of the present invention comprises a recording disk for recording data, a head adapted to access a recording area on the recording disk, a ramp spaced away from an outer peripheral end of the recording disk and to which the head retracts from a position above a surface of the recording disk, a suspension having a deformable gimbals which holds the head and a load beam which holds the gimbals, the suspension being adapted to pivot in a pivotal direction around a pivot shaft, thereby causing the head to a position above the surface of the recording disk and to the ramp, and a drive unit for driving the suspension pivotally. Further, the load beam includes a tab extending from a central part in the pivotal direction of a front end of the load beam and bent in its section in the pivotal direction, the tab being adapted to slide on a surface of the ramp and stop on a stop surface of the ramp, and flanges formed by bending both longitudinally extending edge portions of the load beam at least in an area between an end face on the tab side of the head and the front end of the load beam. Since the ramp is spaced away from the recording disk, it is possible to decrease the power consumption. Furthermore, since the load beam has the above construction, it is possible to suppress the deterioration of rigidity and dynamic characteristics.

In the above first aspect, when the tab is at rest on the stop surface, it is preferable that the suspension be spaced away from the outer peripheral end of the recording disk. Thus it is possible to further decrease the power consumption. Since the recording disk can be mounted after assembly of the ramp and the suspension, it is possible to suppress the generation of dust on the recording disk and improve the reliability in assembling the data storage device.

In some embodiments, the load beam is formed from the head up to the pivot shaft and includes a hinge portion which generates an elastic force toward the recording disk, and the flanges are formed at least between an end on the tab side of the hinge portion and the front end of the load beam. By making the flanges so long, it is possible to enhance the rigidity.

From the standpoint of rigidity and slidability on the ramp it is preferable that the tab be bent in U shape and that the convex portion of the U-shaped tab be adapted to slide on the surface of the ramp.

At a position where the tab comes into contact with an end on the recording disk side of the ramp, the head lies above the recording disk. As a result, even if the tab lies at the front end of the central part of the suspension, the head can be retracted positively to the ramp which is spaced away from the recording disk.

In specific embodiments, the load beam further includes a first aperture formed in a position overlapping the tab-side end face of the head, a second aperture formed on the tab side of the first aperture, and a bridge portion which separates the first and second apertures from each other. With the bridge portion, it is possible to suppress the deterioration of rigidity. Further, it is preferable that the portion between the second aperture and the tab be bent in the pivotal direction. As a result, it is possible to effect machining of the tab and enhance the rigidity thereof.

A suspension in accordance with a second aspect of the present invention has a deformable gimbals which holds a head adapted to access a recording area on a rotating recording disk and a load beam which holds the gimbals. The load beam comprises a tab projecting from a front end of the load beam and being integrally formed centrally in a transverse direction of the front end of the load beam, the tab being bent in its transverse section, flanges formed by bending both longitudinally extending edge portions of the load beam, a first aperture formed in a position overlapping an end on the tab side of the head-disposed position, a second aperture formed on the tab side of the first aperture, and a bridge portion which separates the first and second apertures from each other. With such a construction of the load beam, even in the case where the tab has a predetermined length, it is possible to suppress the deterioration of rigidity and dynamic characteristics.

It is preferable that the flanges be formed at least between the tab-side end of the head-disposed position and the front end of the load beam. The load beam may include a hinge portion which generates an elastic force toward the gimbals, and the flanges are formed at least between an end on the tab side of the hinge portion and the front end of the load beam. If the flanges are formed on the front end side and the flanges are formed long, it is possible to further enhance the rigidity.

The tab may be bent in U shape. The portion between the second aperture and the tab may be bent in the transverse direction of the load beam.

A data storage device in accordance with a third aspect of the present invention comprises a recording disk adapted to store data and rotate, a head adapted to access a recording area on the recording disk which is rotating, a ramp spaced away from an outer peripheral end of the recording disk and to which the head retracts from a position above a surface of the recording disk, a suspension having a deformable gimbals which holds the head and a load beam which holds the gimbals, the suspension being adapted to pivot in a pivotal direction around a pivot shaft, thereby causing the head to move to a position above the surface of the recording disk and to the ramp, and a drive unit for driving the suspension pivotally. The load beam includes a tab extending from a central part in the pivotal direction of a front end of the load beam and being bent in its section in the pivotal direction, the tab being adapted to slide on a surface of the ramp, flanges formed by bending both longitudinally extending edge portions of the load beam, a first aperture formed in a position overlapping an end face on the tab side of the head, a second aperture formed on the tab side of the first aperture, and a bridge portion formed between the first and second apertures to separate the first and second apertures from each other. Since the ramp is spaced away from the recording disk, it is possible to decrease the power consumption. Moreover, since the load beam has the above construction, it is possible to suppress the deterioration of rigidity and dynamic characteristics.

According to the present invention, it is possible to provide a suspension structure which permits an assembling process capable of enhancing the reliability of a data storage device and which suppresses the deterioration in rigidity and dynamic characteristics of a head supporting structure.

DETAILED DESCRIPTION OF THE INVENTION

Embodiments to which the present invention is applicable will be described hereinunder. The following description is for explanation of the embodiment and the present invention is not limited to the following embodiment. For the clarification of explanation, omissions and simplifications will be made as necessary in the following description and the accompanying drawings. It is easy for any person skilled in the art to make changes, additions and conversions of elements in the following embodiment within the scope of the present invention. In the accompanying drawings, the same elements are identified by the same reference numerals, and tautological explanations will be omitted as necessary for the clarification of explanation.

Figure 1:
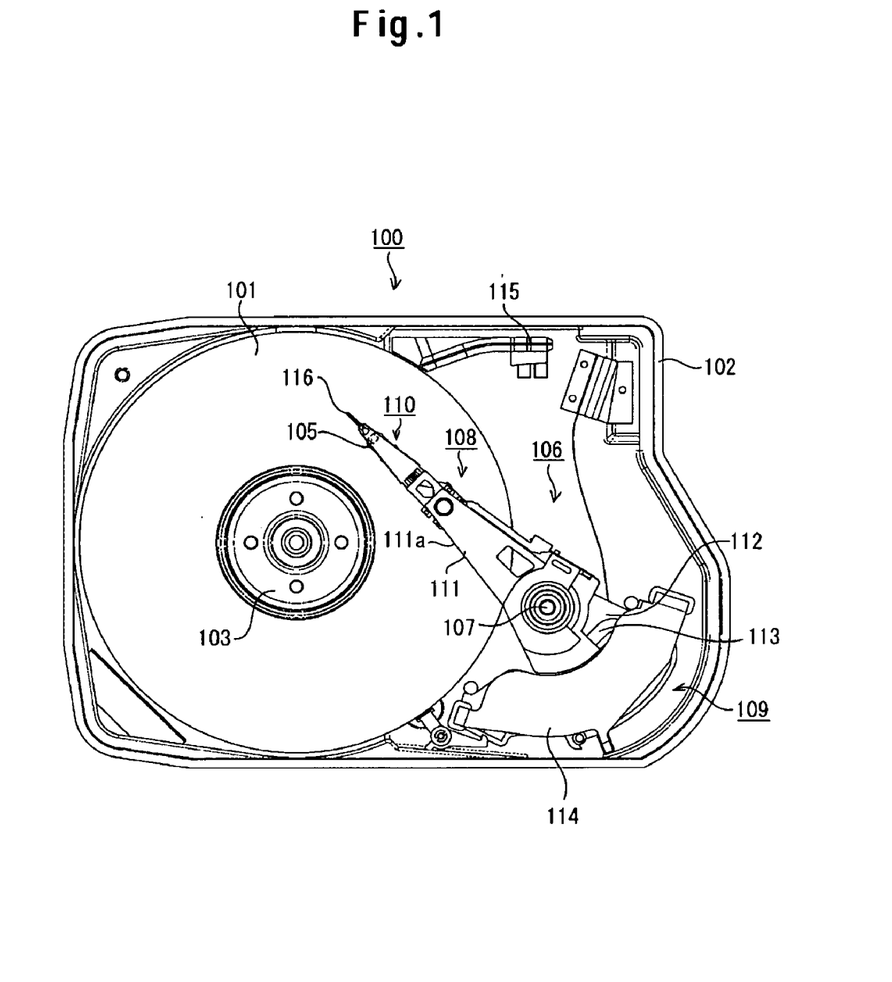
FIG. 1 illustrates a schematic construction of a hard disk drive according to an embodiment of the present invention.

FIG. 1 illustrates a schematic construction of a hard disk drive (HDD) 100 according to an embodiment of the present invention. In the HDD 100 shown in FIG. 1, an actuator is in operation. In the same figure, the numeral 101 denotes a data recording medium (recording disk), which is a non-volatile magnetic disk adapted to record data by magnetization of a magnetic layer. A base 102 constitutes a disk enclosure conjointly with a cover (not shown) fixed to the base, the cover closing an upper opening of the base 102 through a gasket (not shown). Components of the HDD 100 can be accommodated in a hermetically sealed state within the disk enclosure.

Numeral 103 denotes a clamp for fixing the magnetic disk 101 to a spindle motor (not shown). The magnetic disk 101 is rotated at a predetermined speed by the spindle motor which is fixed to a bottom of the base 102. When the HDD 100 is not in operation, the magnetic disk 101 is at a standstill. Numeral 105 denotes a head adapted to access a recording area on the magnetic disk. The head 105 includes a head element and a slider fixed to the head element. The head element is integrally formed with a recording head portion and a reproducing head portion. The recording head portion converts an electric signal into a magnetic field in accordance with data to be recorded to the magnetic disk 101. The reproducing head portion converts a magnetic field provided from the magnetic disk 101 into an electric signal. The recording head portion and the reproducing head portion may be formed separately from each other. Further, the present invention may be applied to an HDD having only one of the recording head portion and the reproducing head portion.

Numeral 106 denotes an actuator for holding and moving the head. In FIG. 1, the actuator 106 is held pivotably by a pivot shaft 107 and includes a carriage 108 and a VCM (voice coil motor) 109 as a drive mechanism. The carriage 108 includes such components as a suspension 110, an arm 111 and a coil support 112 which are connected together in this order from a front end portion of the carriage where the head 105 is disposed.

As to the construction of the suspension 110, it will be described in detail later. The arm 111 is typically formed of an aluminum alloy or a stainless metal and formed by etching into a required shape including a rear aperture for insertion therein of the pivot shaft 107. The suspension 110 is connected by caulking onto a surface of the arm 111 on the side opposed to the magnetic disk 101. From the standpoint of dynamic characteristics, it is preferable that the mass of the suspension 110 be symmetric with respect to a line joining the center of the pivot shaft and the slider of the head 105. Further, from the standpoint of diminishing oscillation in torsion mode, it is preferable that the contour of the arm 111 be symmetric with respect to the line joining the pivot shaft center of the arm 111 and the slider of the head 105.

The coil support 112, which is held pivotably by the pivot shaft 107, holds a flat coil 113 on the side opposite to the arm 111 with respect to the pivot shaft 107. Numeral 114 denotes an upper stator magnet holding plate fixed to the base 102. Though not shown, a lower stator magnet holding plate is disposed below the flat coil 113 so as to sandwich the flat coil 113 between the lower stator magnet holding plate and the upper stator magnetic holding plate 114. The VCM 109 includes the flat coil 113, a stator magnet (not shown) fixed to the upper stator magnet holding plate 114, and a stator magnet (not shown) fixed to the lower stator magnet holding plate. Numeral 115 denotes a ramp for retraction of the head 105 from a surface of the magnetic disk 101 when the rotation of the magnetic disk 101 is stopped. Numeral 116 denotes a tab formed at a front end of the suspension 110. The ramp 115 is secured to the bottom or a side face of the base 102 by a support rod disposed at a position offset from a movement path of the tab 116.

The ramp 115 is in proximity to an outer peripheral end of the magnetic disk 101. In the HDD 100 of this embodiment, the ramp 115 is spaced away from the outer peripheral end of the magnetic disk 101. By disposing the ramp 115 so as not to overlap the magnetic disk 101, it is possible to prevent the generation of a pneumatic friction which can occur between a rotating magnetic disk 101 and the ramp 115 and thereby possible to suppress the consumption of electric power caused by windage loss. Further, it is possible to prevent the air flow over the magnetic disk 101 from being disturbed by the ramp 115 and hence possible to prevent a stable floating of the magnetic head 105 from being obstructed.

In accordance with a drive signal provided from a controller (not shown) to the flat coil 113, the VCM 109 causes the carriage 108 to move pivotally about the pivot shaft 107, whereby the head 105 can be moved to a position above a recording surface of the magnetic disk 101 or to the ramp 115 from the recording surface of the disk 101.

For read or write of data from or to the magnetic disk 101, the actuator 106 causes the head 105 to move to a position above a data area on the surface of the magnetic disk 101 which is rotating. With pivotal motion of the actuator 106, the head 105 moves radially of the recording surface of the magnetic disk 101, whereby the head 105 can access a desired track. Pressure induced by the viscosity of air between an ABS (Air Bearing Surface) of the slider opposed to the magnetic disk 101 and the magnetic disk 101 which is rotating and pressure applied toward the magnetic disk 101 by the suspension 110 are balanced, whereby the head 105 floats over the magnetic disk 101 through a certain gap.

Figure 2:
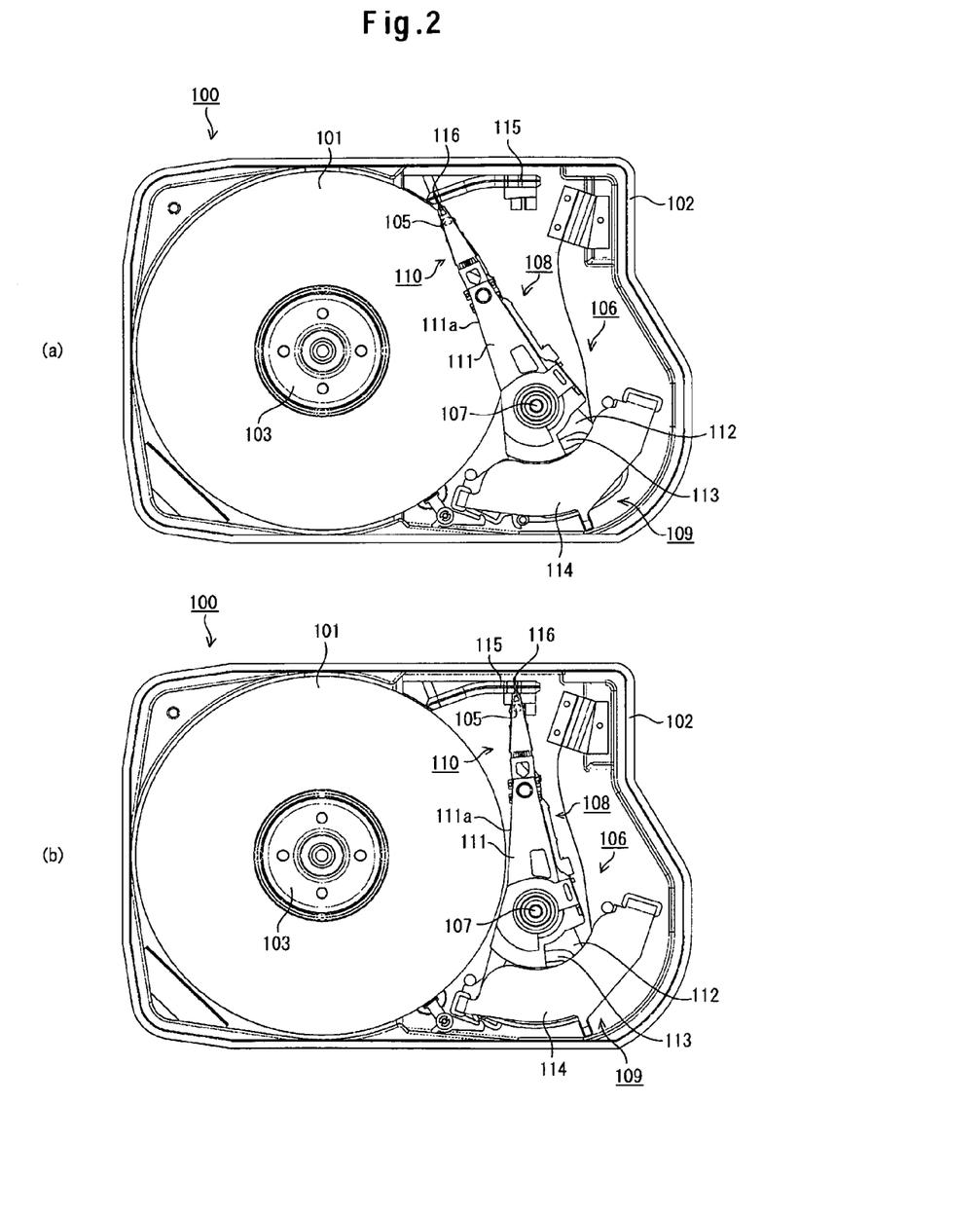
FIG. 2 illustrates a schematic construction of the hard disk drive of the embodiment.

When the rotation of the magnetic disk 101 stops, the head 105 comes into contact with the surface of the magnetic disk 101 and there arises problems such as flaw to the data area due to an attractive phenomenon and failure to rotate of the magnetic disk. Therefore, when the rotation of the magnetic disk 101 stops, the actuator 106 unloads the head 105 from the disk surface and retracts the head 105 to the ramp 115. FIG. 2(*a*) shows in what state the head 105 is unloaded from its position above the magnetic disk 101. The actuator 106 pivots toward the ramp 115 and the tab 116 formed at a front end of the actuator comes into contact with a slide surface of the ramp 115. At this time, the head 105 is in a floating state above the magnetic disk 101 which is rotating. Further, the actuator 106 pivots in a direction (rightwards in FIG. 2(*a*)) away from the magnetic disk 101. The tab 116 moves while sliding on the slide surface of the ramp 115, gets on a stop surface of the ramp 115 and stops at a stop position (a home position). Unloading operation of the magnetic head 105 is now completed. FIG. 2(*b*) shows a state in which the actuator 106 stops at the home position when it is not in operation.

Figure 3:
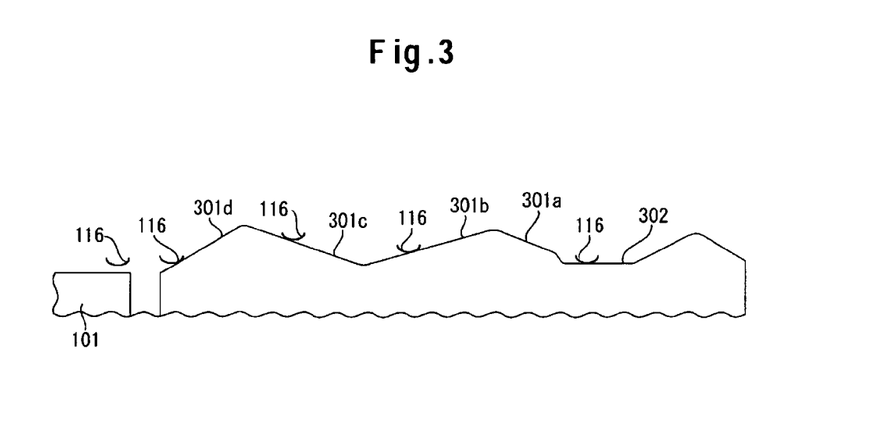
FIG. 3 illustrates movement of a tab with respect to a ramp in the embodiment.

The movement of the tab 116 relative to the ramp 115 in loading and unloading operations will now be described with reference to FIG. 3. In the same figure, the numeral 301 denotes a slide surface of the ramp 115 on which the tab 116 slides. In loading or unloading operation, the tab 116 moves while being in contact with the slide surface 301. The slide surface 301 includes plural slant surfaces 301*a* to 301*d*. Numeral 302 denotes a stop surface on which the tab 116 stops. The tab 116 slides also on the stop surface 302. Unlike the slant surfaces which constitute the slide surface 301, the stop surface 302 is flat. While the actuator 106 is not in operation, the tab 116 stops on the stop surface 302.

In loading operation, the tab 116 moves from the home position on the stop surface 302 toward the magnetic disk 101. The tab 116 slides on the slide surface 301 in order of 301*a-b-c-d*, leaves the slant surface (slide surface) 301*d* and moves onto the magnetic disk 101. In unloading operation, contrary to the loading operation, the tab 116 moves from above the magnetic disk 101 toward the ramp 115. The tab 116 leaving the outer peripheral end of the magnetic disk 101 comes into contact with the slant surface 301*d* and moves toward an end portion of the ramp 115 opposite to the magnetic disk 101. The tab 116 slides on the slide surface 301 in order of 301*d-c-b-a* and stops on the stop surface 302.

In the HDD 100 of this embodiment, as shown in FIG. 2(*b*), the ramp 115 is spaced away from the outer peripheral end of the magnetic disk 101, the ramp and the disk not overlapping each other. When the actuator 106 lies at the home position while it is not in operation, the actuator (also the carriage 108 and the suspension 110) is spaced away from the outer peripheral end of the magnetic disk, the actuator and the disk not overlapping each other. Since the magnetic disk 101 thus does not overlap the ramp 115 and the actuator 106 lying at the home position, it is possible to diminish a windage loss caused by a pneumatic friction between the magnetic disk 101 which is rotating and the ramp 115, as well as the actuator 106, and hence possible to decrease the power consumption. Moreover, it is possible to prevent the air flow over the magnetic disk 101 from being disturbed by the actuator 106 and hence possible to prevent a stable floating of the head 105 from being obstructed, or it is possible to prevent oscillation of the actuator 106 and hence possible to prevent a track follow-up operation from being obstructed.

Further, since the magnetic disk 101 and the actuator 106 or the ramp 115 do not overlap each other, it is possible to mount the magnetic disk 101 after mounting of the ramp 115 and the actuator 106 in the manufacturing process of the HDD 100. If the magnetic disk 101 is mounted before mounting of the ramp 115 and the actuator 106, dust produced by mounting of the ramp 115 or the actuator 106 is apt to accumulate on the magnetic disk 101. The dust is produced by shaving of a screw during tightening of the screw or is deposited on the disk by dropping of dust from a tool or a worker's hand during the mounting work. The dust causes damage of the head 105 or obstructs an accurate data access, with consequent deterioration of the device reliability. As noted above, by mounting the magnetic disk 101 after mounting of the ramp and the actuator, it is possible to effectively decrease the amount of dust deposited on the magnetic disk 101.

The HDD of a both-side recording type described above uses a single magnetic disk 101 for ease of explanation, but in case of recording both sides of each of plural magnetic disks, the plural magnetic disks are held integrally at predetermined spacings in the direction of a rotary shaft of the spindle motor. Suspensions which respectively hold heads for scanning recording surfaces of the magnetic disks are provided by the number corresponding to the number of the recording surfaces and are fixed to the coil support 112 through arms at a position at which they overlap the suspension 110 shown in FIG. 1 at predetermined spacings. The present invention is applicable to HDD having a magnetic disk or disks of a one-side recording type. In such HDD, the bottom of the ramp can be fixed positively to the bottom of the base because no consideration is needed about the tab of the suspension disposed on the lower side.

The construction of the suspension 110 according to this embodiment will now be described in detail. The suspension 110 has a characteristic feature for disposing the ramp 115 and the actuator 106 lying at the stop position (retractive position) spacedly from the outer peripheral end of the magnetic disk 101. Particularly, the suspension 110 is provided centrally of its front end with a tab 116. At the timing of the tab 116 getting on or leaving the ramp 115 it is necessary for the head 105 to fly over the magnetic disk 101 which is rotating. The tab 116 has a length of not shorter than a predetermined length so as to satisfy this condition. The tab 116 and the suspension 110 are formed so as to ensure a rigidity proportional to the long tab 116.

Figure 4:
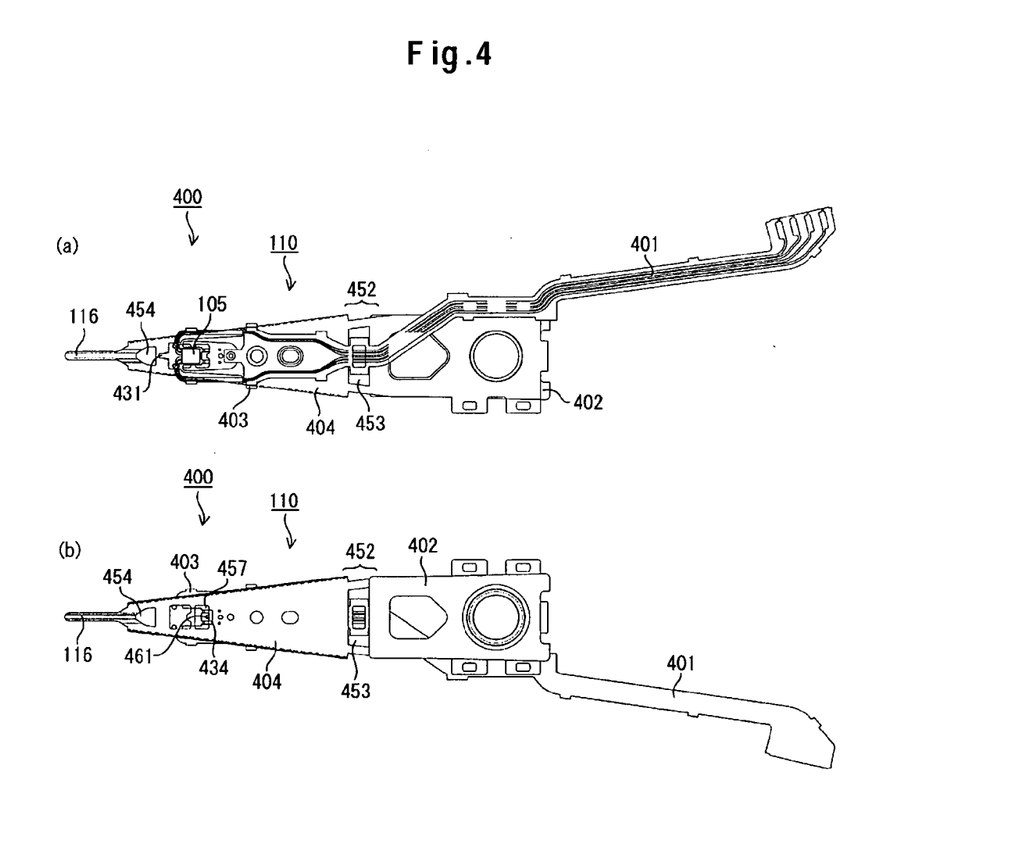
FIG. 4 illustrates the construction of a head suspension assembly in the embodiment.
Figure 5:
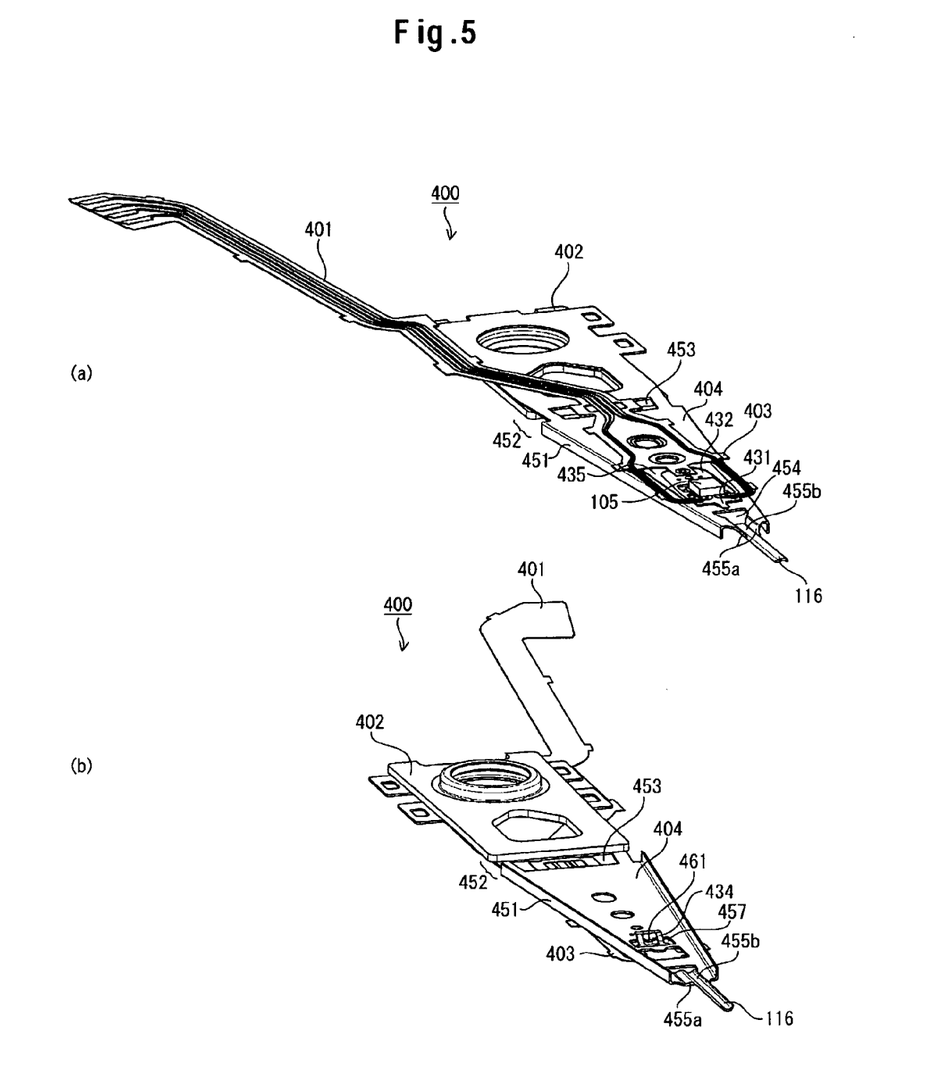
FIG. 5 is a perspective view showing the construction of the head suspension assembly in the embodiment.
Figure 6:
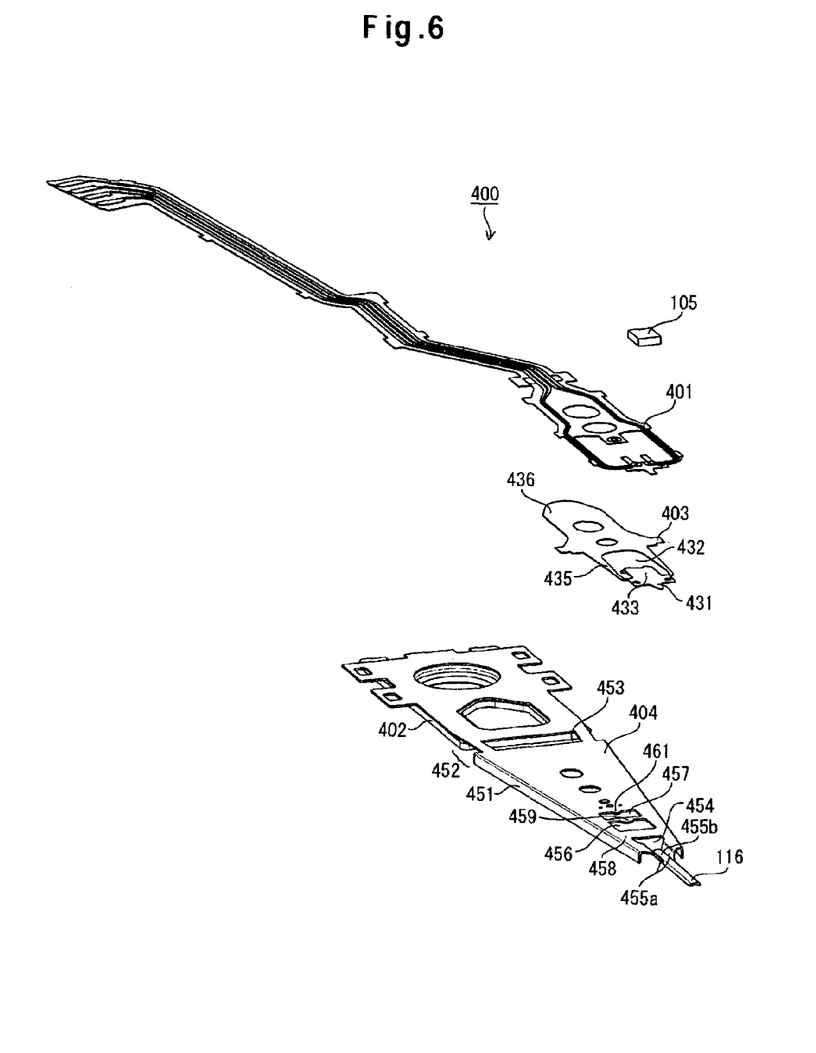
FIG. 6 is an exploded perspective view showing the construction of the head suspension assembly in the embodiment.
Figure 7:
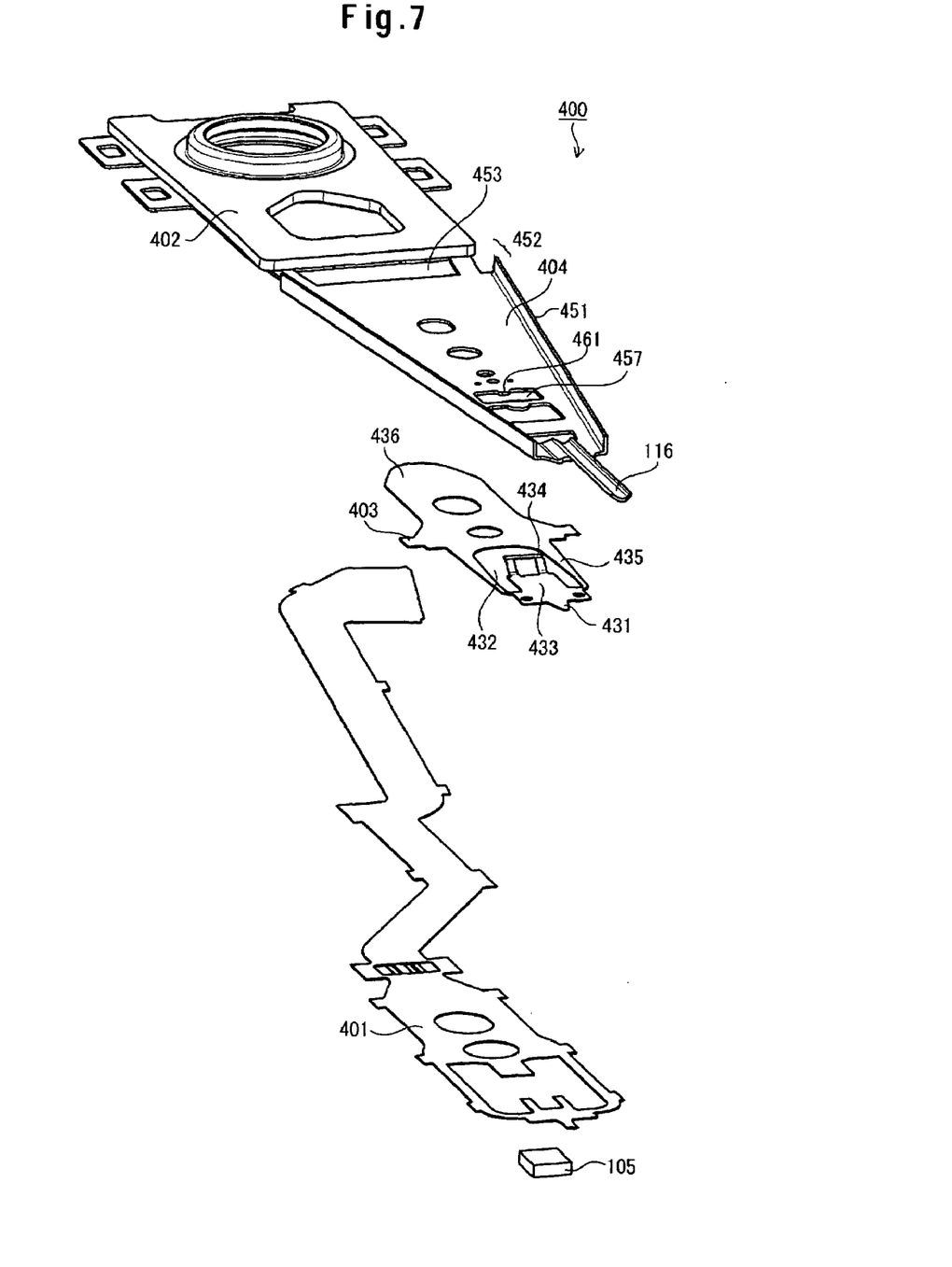
FIG. 7 is an exploded perspective view showing the construction of the head suspension assembly in the embodiment.

FIG. 4 is a plan view showing a schematic construction of a head suspension assembly 400 used in this embodiment, FIG. 5 is a perspective view thereof, and FIGS. 6 and 7 are exploded perspective views showing components of the head suspension assembly 400. FIGS. 4(*a*), 5(*a*) and 6 illustrate the construction of the head suspension assembly 400 as seen from the magnetic disk 101 side, while FIGS. 4(*b*), 5(*b*) and 7 illustrate the construction of the head suspension assembly 400 as seen from the back side opposite to the disk side. In this embodiment, the head suspension assembly 400 is composed of plural components, including the head 105, an FPC (Flexible Printed Circuit) 401 and the suspension 110. The suspension 110 is composed of plural components, including a mounting plate 402, a gimbals 403 and a load beam 404.

In the FPC 401, plural leads are integrally formed on an insulating sheet which is formed by a polyimide film. One ends of the leads constitute a multi-connector connected to an internal circuit such as a head amplifier. Opposite ends of the leads on the head 105 side are connected by soldering or gold bonding to pads formed on the slider of the head 105. The FPC 401 is fixed to the gimbals 403 with use of an adhesive and the outside thereof is covered with an epoxy resin if necessary. The FPC 401 may be formed integrally with the gimbals 403.

Both mounting plate 402 and gimbals 403 are welded to the load beam 404 by laser spot welding. The mounting plate 402 is welded to a rear portion of the load beam 404. The mounting plate 402 is fixed to the load beam 404 on the back side opposite to the side on which the head 105 is held. The mounting plate 402 may be formed of a stainless steel metal. The gimbals 403 is welded to a front portion of the load beam 404. The gimbals 403, which has a desired elasticity and is deformable, may also be formed of a stainless steel metal. A gimbals tab 431 is formed at a front end of the gimbals 403. Where the head suspension assembly 400 undergoes an external shock when the head 105 is in a retracted state to the ramp 115, the gimbals tab 431 comes into contact with the ramp 115, whereby the head suspension assembly 400 can be prevented from damage.

As shown in FIGS. 6 and 7, in a front portion of the gimbals 403, an aperture 432 is formed behind the gimbals tab 431. A gimbals tongue 433 projecting toward the center of the aperture 432 is formed nearly centrally of a front side (the gimbals tab 431 side) of the aperture. The head 105 is fixed through, for example, an epoxy resin of a low elasticity to the gimbals tongue 433 projecting rearwards from the front side of the aperture 432. A dimple (not shown) of the load beam 404 supports the gimbals tongue 433 at one point. Gimbals arms 435, with its elastic force, pushes the gimbals tongue 433 against the dimple. The gimbals tongue 433 can cause the head 105 to move pivotally in a pitching or rolling direction. The gimbals tongue 433 not only can absorb surface oscillation and inclination caused by assembly of the magnetic disk 101 but also exhibit a high follow-up performance in tracking of the magnetic disk 101.

A limiter tab 434 for limiting the movement of the gimbals is formed at the rear end of the gimbals tongue 433. The limiter tab 434 extends to the back side of the load beam 404 through an aperture 457 formed in the load beam 404. When the gimbals 403 is slightly deformed toward the magnetic disk 101 (toward the head 105), the limiter tab 434 comes into contact with the load beam 404 to restrict the deformation of the gimbals 403. When the gimbals 403 is largely deformed toward the magnetic disk 101, the limiter tab 434 is brought into engagement with a lug 461 and restricts the deformation of the gimbals 403.

The gimbals 403 is welded to the load beam 404 at a base portion 436 (see FIGS. 6 and 7) located behind the aperture 432, while the front portion of the gimbals 403, including the gimbals arms 435 and the gimbals tongue 433, is not welded, but is in a free state. The two gimbals arms 435 extending along side ends of the aperture 432 from the gimbals base portion 436 define aperture ends of the aperture 432 and elastically support the gimbals tongue 433 contiguous to front ends of the gimbals arms 435.

Figure 8:
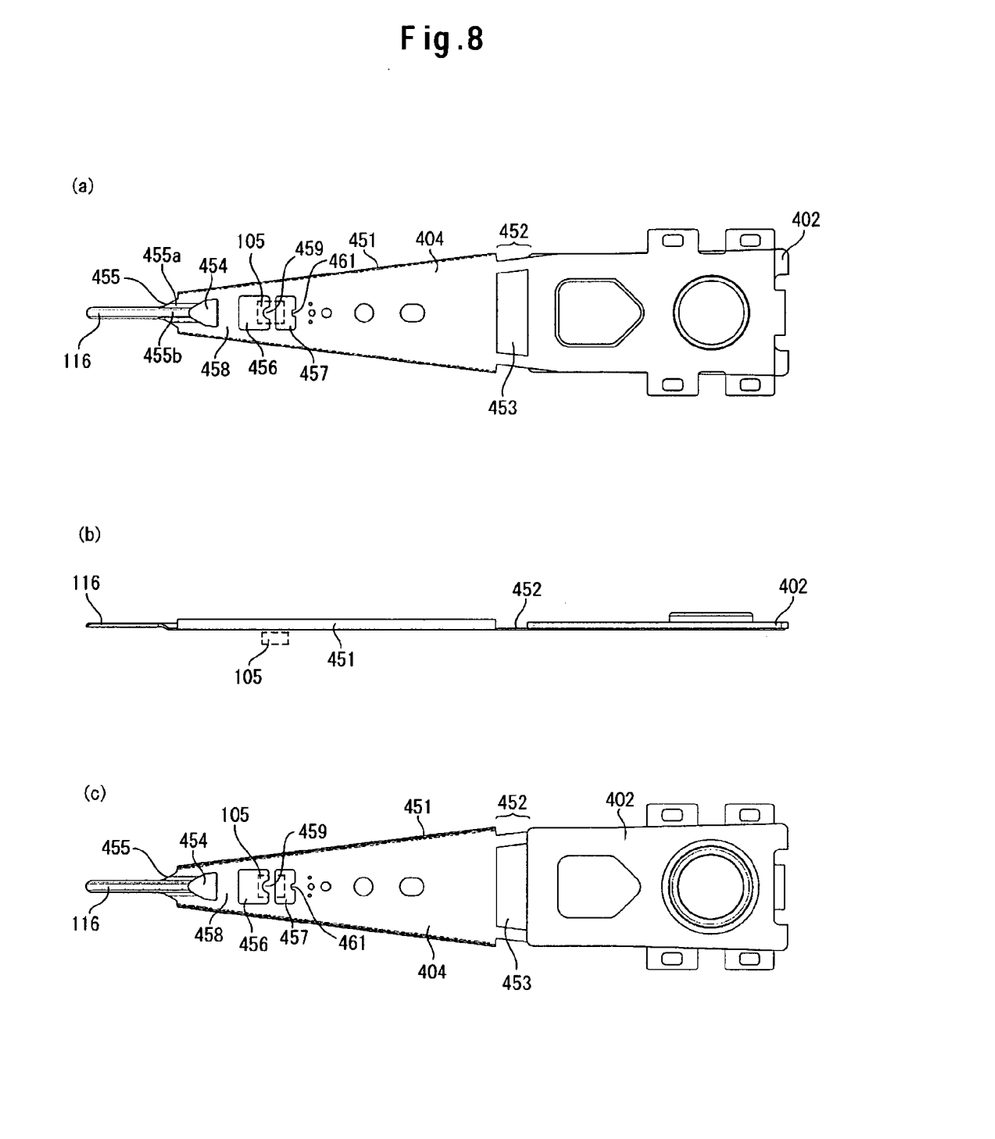
FIG. 8 illustrates the construction of a load beam in the embodiment.

FIG. 8 illustrates the construction of the load beam 404, in which (a) illustrates the head 105 holding side, (b) is a side view, and (c) illustrates the side opposite to the head holding side. The structure of the suspension 110 according to this embodiment will now be described with reference to FIGS. 4 to 8. The load beam 404 is formed by a plate member such as a plate of a stainless steel metal and functions as a precise thin plate spring. The shape of the load beam 404 is determined so as to be thin and light-weight and ensure a required rigidity. The tab 116 is formed at a front end portion of the load beam 404 so as to project from the front end portion. The tab 116 is integral with the load beam 404 and extends forward from the front end portion of the load beam 404. By this integral formation of the tab with the load beam 404, it is possible to suppress an increase in weight of the load beam 404 (and the suspension 110) and hence suppress the deterioration of dynamic characteristics.

As best seen in FIGS. 4 and 7, the tab 116 is formed centrally in the transverse direction of the load beam 404 (in the pivoting direction of the suspension 110) at the front end portion of the load beam. Consequently, it is possible to suppress an oscillating component in a torsional direction (rolling direction) of the suspension 110 and hence possible to suppress the deterioration of dynamic characteristics. In the suspension 110 according to this embodiment, the tab 116 is formed on an axis of symmetry of the suspension 110 and the load beam 404. The axis of symmetry corresponds to a central axis of oscillation in the torsional direction. By thus forming the tab on the central axis of oscillation in the torsional direction, it is possible to effectively suppress the oscillating component.

As described above, the tab 116 has a predetermined length so that it can get on (unloading) the ramp 115 spaced away from the magnetic disk 101 or can move (loading) onto the surface of the magnetic disk 101 from the ramp 115. Therefore, it is necessary for the tab 116 to have such a shape as enhances its rigidity. As shown in FIGS. 5 to 8, the tab 116 used in this embodiment is bent in its transverse direction (oscillating direction). More specifically, the tab 116 is subjected to U-bending so as to be U-shaped in its transverse section, which can be done by pressing. With such a U-bent shape of the tab 116, it is possible to enhance the rigidity of the tab.

From the standpoint of rigidity and contactability during sliding on the ramp 115, it is preferable that the sectional shape of the tab 116 be U shape (including a so-called arcuate shape). However, the tab 116 may be formed in another shape for enhancing its rigidity, e.g., V shape. A rear end (the load beam 404 body side or the head 105 side) of the tab 116 is formed with a wide portion in comparison with the front end thereof. With such a wide portion of the tab 116 formed at the end portion of the tab on the body side of the load beam 404, it is possible to enhance the rigidity of the tab 116.

Referring to FIGS. 5 to 7, flanges 451 are formed along both edges of the load beam 404 in the longitudinal direction of the load beam, i.e., from the tab 116 (front side) toward the pivot shaft 107 (rear side). The flanges 451 are formed from a front side (the tab 116 side) end of a hinge portion 452 up to the front ends of the edges of the load beam 404 (the front end of the load beam 404). The hinge 452 is formed near a front side (tab side) end of the mounting plate 402. In the hinge portion 452, as shown in FIG. 4, an aperture 453 is formed and the flanges 451 are formed up to a tab-side end of the hinge portion 452. The hinge portion 452 produces an elastic force toward the magnetic disk 101 (toward the gimbals 403) and thereby exerts a load on the head 105.

The flanges 451 can be formed by bending edge portions of the load beam 404 toward the side (downward in FIG. 5(a)) opposite to the head 105-fixed side by pressing. The edge portions may be bent to the head-fixed side by design modification. With the flanges 451, it is possible to enhance the rigidity of the load beam 404. In this embodiment, the flanges 451 are formed up to the front end side with respect to the end face on the tab 116 side of the head 105, that is, up to the front ends of the edge portions of the load beam 404 from the position where the front end portion of the head 105 is disposed. By combining the construction of the flanges 451 with that of the tab 116 it is possible to suppress the deterioration of dynamic characteristics in the suspension 110 having the long tab 116. From the standpoint of rigidity it is preferable that the flanges 451 be as long as possible. In this embodiment, the flanges 451 are formed up to the tab-side end of the hinge portion 452.

An aperture 454 is formed near the front end of the load beam 404. The aperture 454 permits the tab 116 to be machined in a desired shape. A bent portion 455 which is bent in the transverse direction of the load beam 404 is formed between a front end of the aperture 454 and the tap 116. With the bent portion 455, the rigidity of the load beam 404 is enhanced at and near the front end of the load beam 404 and it becomes possible to effect U-bending of the tab 116. As shown in the figure, the bent portion 455 comprises a portion 455a extending from the front end of the aperture 454 up to the front end of the load beam 404 and bent in the same direction as the flanges 451 and a portion 455b formed in the same shape as the tab 116 and extending from the tab 116 up to the front end of the aperture 454. The portion 455b is contiguous to the portion 455a and is bent from the portion 455a toward the head 105.

Another aperture 456 is formed behind the aperture 454. Further, behind the aperture 456 is formed an aperture 457 for restricting the deformation of the gimbals as noted above. The aperture 456 is used to fix the head 105 to the gimbals tongue 433 and clamp the head 105 in a wire bonding step for the head. As shown in FIG. 8, the aperture 456 is formed in a position in which a front end face of the head 105 overlaps the aperture 456. Consequently, the gimbals 403 or the head 105 can be borne from the back side of the load beam 404 and thus it is possible to carry out the head mounting operation effectively. A lug 459 projecting toward the center of the aperture 456 is formed nearly centrally of a rear side of the aperture 456 (the pivot shaft 107 side). As described above, in the lug 459 there is formed a dimple (not shown) raised toward the gimbals 403 (toward the head 105 (upward in the figure)).

The apertures 454 and 456 are not formed in an integrally contiguous manner, but are separated from each other by a bridge portion 458. If the bridge portion 458 is formed between the apertures 454 and 456, it is possible to enhance the rigidity of the load beam 404 and the suspension 110. Although in this embodiment the load beam 404 has a single bridge portion 458 formed by a plate-like portion, plural bridge portions may be formed between the apertures 454 and 456. Further, although in the figure the edges of the bridge portion 458 are rectilinear, the edges may be formed in a predetermined shape such as a curvilinear shape. With the apertures 454 and 456, it is possible to improve the machinability of the load beam 404 and make the assembly of the suspension 110 efficient. Further, with the bridge portion 458, it is possible to enhance the lift-up rigidity.

Figure 9:
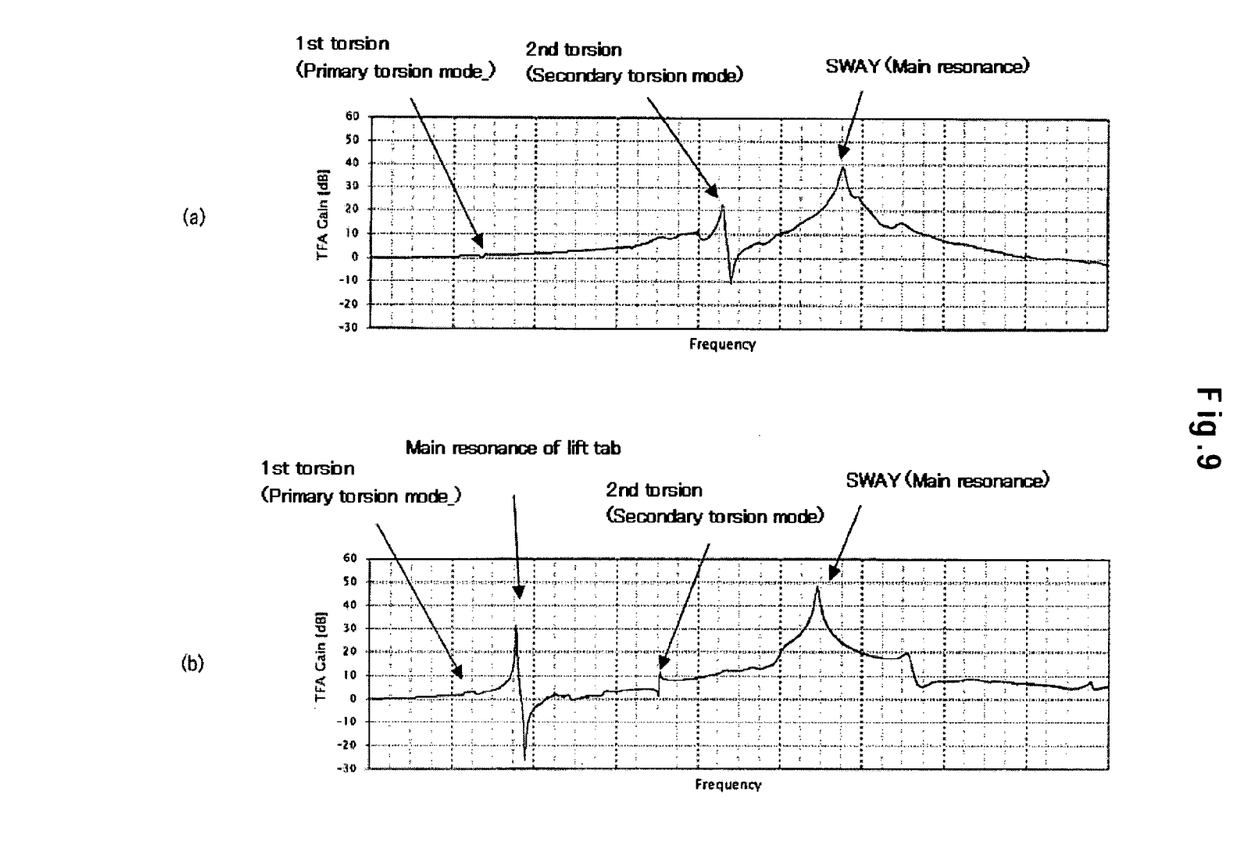
FIG. 9 illustrates distributions of oscillating components in the head suspension assembly in the embodiment and oscillating components in a comparative example.

FIG. 9 graphically shows distributions of oscillating components in the head suspension assembly according to the present invention described above and in a head suspension assembly as a comparative example. In the comparative head suspension assembly, the tab 116 used in the present embodiment is substituted by a rod-like member fixed to the load beam front end. FIG. 9(a) shows the distribution of oscillating components in the head suspension assembly according to the present embodiment and FIG. 9(b) shows the distribution of oscillating components in the comparative head suspension assembly.

In FIG. 9, the X axis corresponds to frequency and the Y axis represents relative values of oscillation strengths. As is seen from FIG. 9, in the head suspension assembly according to the present embodiment, a main resonance of the tab is not observed on the low frequency side. Further, in comparison with the comparative example, an oscillation component in a secondary torsion mode is observed on the high frequency side and thus the influence of the secondary torsion mode in actual operation is low. Thus, according to the present embodiment, the ramp 115 is spaced away from the magnetic disk 101, so in the case where a long suspension has a long tab, it is possible to effectively suppress the deterioration in dynamic characteristics of the head suspension assembly (or the suspension).

The present invention is applicable not only to HDD but also to various types of storage devices in which storage data are processed optically. The present invention is also applicable to a data storage device having a head which performs only read or write.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A suspension having deformable gimbals which hold a head configured to access a recording area on a rotating recording disk and a load beam which supports said gimbals, said load beam comprising:
    a tab projecting from a front end of said load beam and being integrally formed centrally in a longitudinal direction of the front end of the load beam, said tab being bent in a transverse section thereof;
    flanges formed by bending both longitudinally extending edge portions of said load beam;
    a first aperture formed in a position overlapping an end on a tab side of a head-disposed position of the head on the load beam toward the tab;
    a second aperture formed on a tab side of said first aperture;
    a bridge portion which separates said first and second apertures from each other, and
    wherein said tab extends from said second aperture, which has bent portions bending longitudinally in the same direction as said flanges.

2. A suspension according to claim 1, wherein said flanges are formed at least between the tab-side end of the head-disposed position and the front end of said load beam.

3. A suspension according to claim 2, wherein said load beam includes a hinge portion which generates an elastic force toward said gimbals, and said flanges are formed at least between an end on a tab side of said hinge portion and the front end of said load beam.

4. A suspension according to claim 1, wherein said tab is bent in U shape.

5. A suspension according to claim 1, wherein the portion between said second aperture and said tab is bent in the transverse direction of said load beam.

6. A data storage device comprising:
    a recording disk configured to record data and rotate;
    a head configured to access a recording area on said recording disk which is rotating;
    a ramp spaced away from an outer peripheral end of said recording disk and to which said head retracts from a position above a surface of said recording disk;
    a suspension having deformable gimbals which support said head and a load beam which supports said gimbals, said suspension being configured to pivot in a pivotal direction around a pivot shaft, to cause said head to move to a position above the surface of said recording disk and to said ramp; and
    a drive unit configured to drive said suspension pivotally, wherein said load beam includes:
    a tab extending from a central part in a longitudinal direction of a front end of said load beam and being bent in a section thereof in said pivotal direction, said tab being configured to slide on a surface of said ramp;

flanges formed by bending both longitudinally extending edge portions of said load beam;

a first aperture formed in a position overlapping an end face on a tab side of said head;

a second aperture formed on a tab side of said first aperture;

a bridge portion formed between said first and second apertures to separate said first and second apertures from each other, and wherein said tab extends from said second aperture, which has bent portions bending longitudinally in the same direction as said flanges.

7. A data storage device according to claim 6, wherein when said tab is at rest on said ramp surface, said suspension is spaced away from the outer peripheral end of said recording disk.

8. A data storage device according to claim 6, wherein said load beam is formed from said head up to an arm portion and includes a hinge portion which generates an elastic force toward said recording disk, and said flanges are formed at least between an end on a tab side of said hinge portion and the front end of said load beam.

9. A data storage device according to claim 6, wherein said tab is bent in U shape and the convex portion of the U-shaped tab is configured to slide on the surface of said ramp.

10. A data storage device according to claim 6, wherein the portion between said second aperture and said tab is bent in said pivotal direction.

11. A data storage device according to claim 6, wherein, at a position where said tab comes into contact with an end on a recording disk side of said ramp, said head lies above the recording disk.

12. A data storage device comprising:

a recording disk for recording data;

a head configured to access a storage area on the recording disk;

a ramp spaced away from an outer peripheral end of the recording disk and to which said head retracts from a position above a surface of said recording disk;

a suspension having deformable gimbals which support said head and a load beam which supports said gimbals, said suspension being configured to pivot in a pivotal direction around a pivot shaft, to cause said head to move to a position above the surface of said recording disk and to said ramp; and a drive unit configured to drive said suspension, wherein said load beam includes:

a tab extending from a central part in a longitudinal direction of a front end of said load beam and bent in a section thereof in said pivotal direction, said tab being configured to slide on a surface of said ramp and stop on a stop surface of said ramp;

flanges formed by bending both longitudinally extending edge portions of said load beam in an area between an end face on a tab side of said head toward the tab and the front end of said load beam;

a first aperture formed in a position overlapping the tab-side end face of said head;

a second aperture formed opposite the tab side of said first aperture;

a tab aperture having bent portions bending longitudinally in the same direction as said flanges; and a bridge portion which separates said first aperture and said tab aperture from each other, wherein said tab extends from said tab aperture.

13. A data storage device according to claim 12, wherein when said tab is at rest on said stop surface, said suspension is spaced away from the outer peripheral end of said recording disk.

14. A data storage device according to claim 12, wherein said load beam is formed from said head up to an arm portion and includes a hinge portion which generates an elastic force toward said recording disk, and said flanges are formed at least between an end on a tab side of said hinge portion and the front end of said load beam.

15. A data storage device according to claim 12, wherein said tab is bent in U shape and the convex portion of the U-shaped tab is configured to slide on the surface of said ramp.

16. A data storage device according to claim 12, wherein the portion between said tab aperture and said tab is bent in said pivotal direction.

17. A data storage device according to claim 12, wherein, at a position where said tab comes into contact with an end on a recording disk side of said ramp, said head lies above the recording disk.

* * * * *